(12) United States Patent
Tawada

(10) Patent No.: US 12,107,512 B2
(45) Date of Patent: Oct. 1, 2024

(54) POWER CONVERSION DEVICE CONVERTING DC POWER SUPPLY INTO AC POWER

(71) Applicant: TMEIC Corporation, Chuo-ku (JP)

(72) Inventor: Yoshihiro Tawada, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 127 days.

(21) Appl. No.: 17/755,058

(22) PCT Filed: Oct. 8, 2020

(86) PCT No.: PCT/JP2020/038193
§ 371 (c)(1),
(2) Date: Apr. 20, 2022

(87) PCT Pub. No.: WO2022/074803
PCT Pub. Date: Apr. 14, 2022

(65) Prior Publication Data
US 2022/0376632 A1 Nov. 24, 2022

(51) Int. Cl.
*H02M 7/48* (2007.01)
(52) U.S. Cl.
CPC .................... *H02M 7/48* (2013.01)
(58) Field of Classification Search
CPC ........ H02M 1/0025; H02M 1/32; H02M 7/48; Y02E 10/56
See application file for complete search history.

(56) References Cited

U.S. PATENT DOCUMENTS

| | | | | |
|---|---|---|---|---|
| 5,179,842 | A | * | 1/1993 | Kanazawa ............ H02M 7/48 361/22 |
| 5,666,275 | A | * | 9/1997 | Inokuchi ............ H02M 7/7575 363/35 |
| 2010/0033996 | A1 | * | 2/2010 | Kono ...................... H02M 7/48 363/37 |
| 2011/0249475 | A1 | * | 10/2011 | Fujii ...................... H02M 7/48 363/50 |

(Continued)

FOREIGN PATENT DOCUMENTS

JP WO2018/235278 A1 12/2018

OTHER PUBLICATIONS

Indian Office Action issued Oct. 12, 2023 in Indian Patent Application No. 202217021227, 5 pages.

(Continued)

*Primary Examiner* — Yusef A Ahmed
(74) *Attorney, Agent, or Firm* — Oblon, McClelland, Maier & Neustadt, L.L.P.

(57) ABSTRACT

A power conversion device include a switch for switching so as to output by selecting one of a command value the first DC voltage controller outputs or holds or the command value the second DC voltage controller outputs, a detector that detects the opening of the contactor and the recovery from voltage disturbance in the system on the AC side of the power conversion circuit, and a switching controller controls the switching of the switch so that selects and outputs the command value output by the second DC voltage controller when the detector detects the opening of the contactor, and selects and outputs the command value held by the first DC voltage controller when the detector detects the recovery from the voltage disturbance.

1 Claim, 1 Drawing Sheet

(56) References Cited

U.S. PATENT DOCUMENTS

| | | | | |
|---|---|---|---|---|
| 2011/0261589 A1* | 10/2011 | Goto | ................ | H02M 3/33592 |
| | | | | 363/15 |
| 2012/0106218 A1* | 5/2012 | Awane | ............... | H02M 1/4225 |
| | | | | 363/127 |
| 2013/0027993 A1* | 1/2013 | Tan | ........................ | H02J 3/24 |
| | | | | 363/40 |
| 2013/0033914 A1* | 2/2013 | Yahata | ................. | H02M 7/48 |
| | | | | 363/132 |
| 2013/0058144 A1* | 3/2013 | Hiramatsu | ............ | H02M 7/48 |
| | | | | 363/131 |
| 2013/0127383 A1* | 5/2013 | Kawamura | .......... | H02P 21/36 |
| | | | | 318/400.09 |
| 2013/0222951 A1* | 8/2013 | Zhu | ........................ | H02H 7/122 |
| | | | | 361/18 |
| 2013/0279213 A1* | 10/2013 | Saeki | ................. | H02M 5/4585 |
| | | | | 363/125 |
| 2013/0336025 A1* | 12/2013 | Figueroa | ............. | H02M 5/4585 |
| | | | | 363/37 |
| 2013/0336026 A1* | 12/2013 | Figueroa | ............. | H02M 5/458 |
| | | | | 363/95 |
| 2013/0336030 A1* | 12/2013 | Figueroa | ............. | H02M 7/539 |
| | | | | 363/79 |
| 2015/0280591 A1* | 10/2015 | Handa | ............... | H02M 1/4225 |
| | | | | 363/21.04 |
| 2016/0301233 A1* | 10/2016 | Takeuchi | ............. | B60L 53/14 |
| 2017/0093324 A1* | 3/2017 | Saha | ..................... | H02M 1/36 |
| 2018/0183319 A1* | 6/2018 | Akita | .................. | H02J 7/0068 |
| 2018/0212460 A1* | 7/2018 | Shibata | ................ | H02J 9/062 |
| 2018/0278144 A1* | 9/2018 | Nakano | ................. | H02M 7/797 |
| 2018/0375372 A1* | 12/2018 | Toyoda | .................... | H02J 9/06 |
| 2019/0190402 A1* | 6/2019 | Kamatani | ......... | H02M 7/53871 |
| 2019/0260300 A1* | 8/2019 | Horikoshi | ............. | H02M 7/48 |
| 2019/0334445 A1* | 10/2019 | Ishikawa | ................ | H02M 7/48 |
| 2019/0363569 A1* | 11/2019 | Toyoda | ..................... | H02J 9/06 |
| 2020/0021185 A1* | 1/2020 | Yamamura | .............. | H02M 1/08 |
| 2020/0067417 A1* | 2/2020 | Toyoda | ............... | H02M 7/5395 |
| 2020/0169217 A1* | 5/2020 | Oomori | ................ | H02M 3/155 |
| 2020/0204103 A1* | 6/2020 | Tobayashi | ............... | H02P 21/22 |
| 2021/0021124 A1* | 1/2021 | Jansson | ..................... | B60L 7/22 |
| 2022/0060117 A1* | 2/2022 | Matsui | ............. | H02M 3/33569 |
| 2022/0158568 A1* | 5/2022 | Uda | .............. | H02M 1/0025 |
| 2023/0155519 A1* | 5/2023 | Tawada | ..................... | H02J 3/40 |
| | | | | 363/95 |
| 2023/0216437 A1* | 7/2023 | Tsukamoto | ............... | B60L 1/00 |
| | | | | 307/9.1 |
| 2023/0261587 A1* | 8/2023 | Aoyagi | .................. | H02M 1/32 |
| | | | | 363/95 |
| 2023/0318305 A1* | 10/2023 | Katsukura | ............ | H02M 1/143 |
| | | | | 307/151 |
| 2023/0318487 A1* | 10/2023 | Mizuguchi | .............. | H02P 27/06 |
| | | | | 363/13 |
| 2023/0352253 A1* | 11/2023 | Hayashi | ................ | H02M 1/344 |

OTHER PUBLICATIONS

International Search Report and Written Opinion issued Dec. 8, 2020 in PCT/JP2020/038193, filed on Oct. 8, 2020, 8 pages.

* cited by examiner

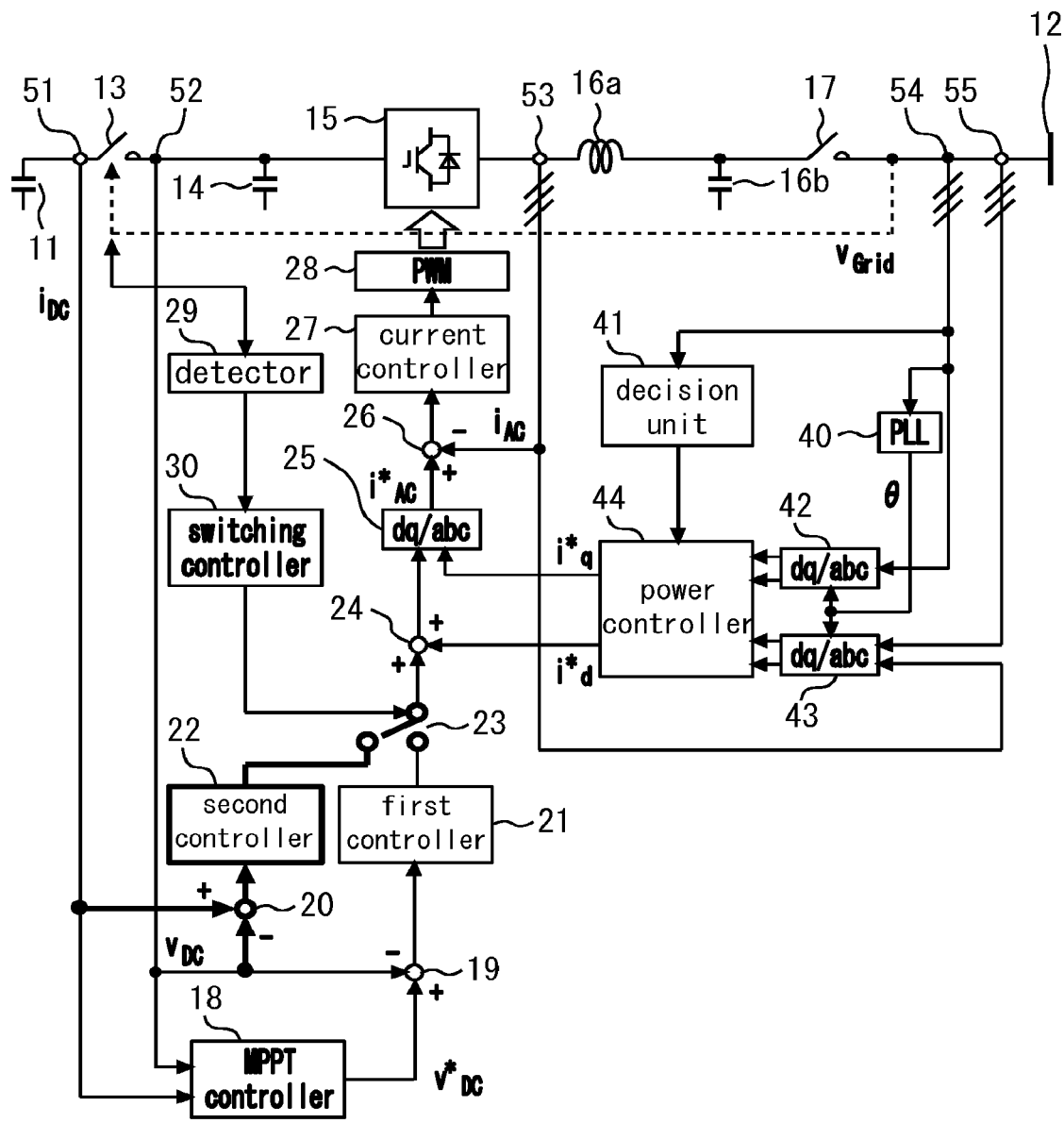

POWER CONVERSION DEVICE CONVERTING DC POWER SUPPLY INTO AC POWER

TECHNICAL FIELD

The present invention relates to a power conversion device.

BACKGROUND ART

A power conversion device having an inverter for converting DC power supplied from a DC power supply such as a solar cell or a battery into AC power based on a PWM (Pulse Width Modulation) signal is known. Further, a power supply system in which a direct-current electric path between a solar cell module and a power conversion device is grounded via a switch is known.

CITATION LIST

Patent Literature

[Patent Document 1] International Publication No. 2018/235278

SUMMARY OF INVENTION

Technical Problem

In the power conversion device having an inverter linked to the power system, when taking the power supply of the contactor disposed on the DC side of the inverter from the system of the AC side, when disturbance occurs in the system of the AC side, it is impossible to maintain the voltage for keeping the contactor closed, the contactor may be opened.

When the contactor is opened because the disturbance is generated in the system on the AC side, it is necessary to charge the DC capacitor charged by the DC voltage appearing on the DC side of the inverter from the system side in order to maintain the DC voltage of the inverter.

And, after the system on the AC side recovers from the disturbance, it is necessary to rapidly switch the output of the inverter from the charging mode to the discharging mode.

However, in the conventional MMPT(Maximum power point tracking) recovery process using control or the like, there is a problem that it is impossible to return the output to the normal state within the recovery time specified in the system interconnection provisions.

The present invention has been made to solve the problems as described above, even if a difference occurs in the DC voltage of the DC input voltage and the inverter side because the disturbance is generated in the system of the AC side, after the disturbance elimination of the system of the AC side it is an object of the present invention to provide a power conversion device capable of enhancing the responsiveness of returning to normal operation.

Solution to Problem

The power conversion device according to one aspect of the present invention includes: a power conversion circuit for converting DC power supplied from the DC power supply into AC power based on the PWM signal; a DC capacitor which is charged by a DC voltage appearing on the DC side of the power conversion circuit; a contactor for opening and closing so as to perform the supply and shutoff of DC power from the DC power supply by the power supplied from the AC side of the system of the power conversion circuit to the DC capacitor and the power conversion circuit; a first DC voltage controller hold the last command value output while controlling the DC voltage used for the reference of the PWM signal by outputting a command value; a second DC voltage controller controls the DC voltage used for the reference of the PWM signal so as to reduce the difference between the DC voltage of the DC power supply and the DC voltage appearing on the DC side of the power conversion circuit by outputting a command value; a switch for switching so as to output by selecting one of a command value the first DC voltage controller outputs or holds or the command value the second DC voltage controller outputs; a detector that detects the opening of the contactor and the recovery from voltage disturbance in the system on the AC side of the power conversion circuit; and a switching controller controls the switching of the switch so that selects and outputs the command value output by the second DC voltage controller when the detector detects the opening of the contactor, and selects and outputs the command value held by the first DC voltage controller when the detector detects the recovery from the voltage disturbance.

According to the present invention, even if a difference occurs in the DC voltage of the DC input voltage and the inverter side because the disturbance is generated in the system of the AC side, it is possible to enhance the responsiveness to return to normal operation after the disturbance elimination of the system of the AC side.

BRIEF DESCRIPTION OF DRAWING

FIG. 1 is a diagram showing a configuration example of a power conversion device according to an embodiment.

DESCRIPTION OF EMBODIMENTS

Hereinafter, an embodiment of a power conversion apparatus will be described with reference to the drawings. FIG. 1 is a diagram showing a configuration example of a power conversion device 10 according to an embodiment.

For example, the power conversion device 10 is provided between the DC power supply 11 and the power grid 12, converts the DC power into three-phase AC power. DC power supply 11 is, for example, a solar cell module. The power grid 12 is also commonly referred to as a power system. The power system is a system for supplying power to the power receiving facility of the customer, for example, an unspecified load is assumed to be connected. For example, an electric power system is a system that integrates power generation, transformation, transmission, and distribution.

Power conversion device 10 includes a DC-side contactor 13, a DC capacitor 14, a power conversion circuit 15, an AC reactor 16a, an AC capacitor 16b, and a contactor 17 of the AC side. Further, the power conversion device 10 includes an instrument current transformer (CT) 51, an instrument transformer (VT) 52, an instrument current transformer (CT) 53, an instrument transformer (VT) 54, and an instrument current transformer (CT) 55.

Furthermore, the power conversion device 10 includes a MPPT controller 18, a first subtractor 19, a second subtractor 20, a first controller (first DC voltage controller) 21, a second controller (second DC voltage controller) 22, a switch 23, a first adder 24, a first coordinate converter 25, a third subtractor 26, a current controller 27, a PWM drive circuit 28, a detector 29, and a switching controller 30.

Furthermore, the power conversion device 10 includes a phase synchronizing circuit (PLL circuit) 40, a decision unit 41, a second coordinate converter 42, a third coordinate converter 43, and a power controller 44.

Contactor 13, the power supplied from the AC side of the system of the power conversion circuit 15, with respect to the DC capacitor 14 and the power conversion circuit 15, and opens and closes to perform the supply and interruption of DC power from the DC power supply 11.

DC capacitor 14 is arranged to be charged by a DC voltage appearing on the DC side of the power conversion circuit 15.

Power conversion circuit 15 is interposed between the DC power supply 11 and the power grid 12, and forms a series circuit with them. Then, the power conversion circuit 15 converts the DC power supplied from the DC power supply 11 to AC power based on the PWM signal (described later). DC end of the power conversion circuit 15 is connected to the contactor 13. Incidentally, the power conversion circuit 15 may be a three-phase voltage type inverter circuit including, for example, a plurality of semiconductor switching elements.

That is, the power conversion circuit 15, by converting the DC input power from the DC power supply 11, and outputs the first AC output current and the first AC output voltage. For convenience of explanation, this first AC output current is also referred to as "an inverter output current $i_{A\ C}$", the first AC output voltage is also referred to as "an inverter output voltage $V_{A\ C}$".

AC reactor 16a and the AC capacitor 16b is an LC filter circuit connected to the L-type, is provided between the power conversion circuit 15 and the contactor 17. Incidentally, in FIG. 1, the AC reactor 16a and the AC capacitor 16b has been described in a simplified, in practice, the output wiring of the three-phase is extended on the output side of the power conversion circuit 15. That is, in practice, each of the output wiring of the three-phase, a set of AC reactors 16a and the AC capacitor 16b is provided.

AC reactor 16a is connected in series with the AC end of the power conversion circuit 15. Then, the first end of the contactor 17 is connected to the AC reactor 16a. The second end of contactor 17 is connected to power grid 12. The first end of the AC capacitor 16b is connected to the wiring connecting the AC reactor 16a and the contactor 17 (e.g., busbars).

Then, the AC reactor 16a and the AC capacitor 16b filters the first AC output current (i.e. inverter output current $i_{A\ C}$) and the first AC output voltage (i.e. inverter output voltage $V_{A\ C}$). This filtration, the AC reactor 16a and the AC capacitor 16b generates a second AC output current and a second AC output voltage. For convenience of explanation, the second AC output current is also referred to as "AC output current $i_{o\ u\ t}$", the second AC output voltage is also referred to as "AC output voltage $V_{o\ u\ t}$". AC output current $i_{o\ u\ t}$ is a current flowing through the connecting point between the AC reactor 16a and the AC capacitor 16b.

AC output voltage $V_{o\ u\ t}$ is a voltage applied to the AC capacitor 16b.

Current transformer for instrument (CT) 51 converts the DC current $i_{D\ C}$ into a reading for instrument. DC current $i_{D\ C}$ is a current flowing between the DC power supply 11 and the power converting circuit 15.

An instrument transformer (VT) 52 converts a DC-voltage $V_{D\ C}$ into an instrument reading. DC voltage $V_{D\ C}$ is a voltage between the DC power supply 11 and the power converting circuit 15, the voltage of the DC capacitor 14.

Current transformer for instrument (CT) 53 converts the inverter-output current $i_{A\ C}$ to a value for instrument. Inverter output current $i_{A\ C}$ is a three-phase AC output current flowing between the power conversion device circuit 15 and the AC reactor 16a.

An instrument transformer (VT) 54 converts the AC output-voltage $V_{o\ u\ t}$ into an instrument reading. Current transformer for instrument (CT) 55 converts the AC output current $i_{o\ u\ t}$ into a value for instrument.

MPPT controller 18, a DC current $i_{D\ C}$ and the DC voltage $V_{D\ C}$ is input. MPPT controller 18 maximizes the DC power from the DC power supply 11 by MPPT control. The first subtractor 19 calculates the difference between the command value $V^*_{D\ C}$ and the DC voltage $V_{D\ C}$ outputted by MPPT controller 18.

The second subtractor 20, based on the DC current $i_{D\ C}$ and the DC voltage $V_{D\ C}$, and the DC voltage of the DC power supply 11, calculates the difference between the DC voltage appearing on the DC side of the power conversion device circuit 15.

The first controller 21 performs DC voltage control based on the subtraction result of the first subtractor 19. For example, the first controller 21, the DC voltage used for the reference of the PWM signal (described later) PWM driving circuit 28 outputs, while controlling by outputting a command value, the last command value output a first DC voltage controller for holding.

The second controller 22 performs DC voltage control based on the subtraction result of the second subtractor 20. For example, the second controller 22 includes a DC voltage of the DC power supply 11, so as to reduce the difference between the DC voltage appearing on the DC side of the power conversion circuit 15, the reference of the PWM signal (described later) a DC voltage used, a second DC voltage controller for controlling by outputting a command value.

Switch 23, in accordance with the control of the switching controller 30 to be described later, a command value the first controller 21 outputs or holds, the second controller 22 selects one of the command values output to switch to output.

The first adder 24 adds the output value and the d-axis current command value $i^*_d$ of the switch 23. D-axis current command value $i^*_d$ is a command value to be output by the power controller 44 to be described later.

The first coordinate transformation unit 25 performs the conversion of the dq-axis/abc-axis, that is, the coordinate transformation from two-phase to three-phase. The first coordinate converter 25 calculates the inverter current command value $i^*_{A\ C}$ based on the addition result and the q-axis current command value $i^*_q$ of the first adder 24. Q-axis current command value $i^*_q$ is a command value to be output by the power controller 44 to be described later.

The third subtractor 26 calculates the difference between the inverter current command value $i^*_{A\ C}$ and the inverter output current $i_{A\ C}$.

Current controller 27 calculates a current command value based on the output of the third subtractor 26.

PWM drive circuit 28 generates a pulse width modulated signal (PWM signal) according to the current command value of the current controller 27. PWM driving circuit 28 transmits the PWM signal to the power conversion circuit 15 as a drive signal of the semiconductor switching element.

Detection unit 29 detects the opening of the contactor 13, and the return from the disturbance of the voltage in the AC side of the system of the power conversion circuit 15, and outputs the detection result to the switching controller 30.

Incidentally, the detector 29, whether or not the return from the disturbance of the voltage in the AC side of the system of the power conversion circuit 15 is completed, for example, may be detected in accordance with the operation of the contactor 13, it may be detected based on other information. For example, the detector 29, when detecting that the contactor 13 is closed, the voltage in the system of the AC side of the power conversion circuit 15 may be detected to have returned from the disturbance. The detector 29 directly detects the information based on the voltage change in the AC side of the system of the power conversion circuit 15 may detect that the voltage has returned from the disturbance.

Switching controller 30, when the detector 29 detects the opening of the contactor 13, the second controller 22 selects and outputs a command value outputted, when the detector 29 detects the return from the disturbance of the voltage, the first controller 21 controls the switching of the switch 23 so as to select and output a command value held.

Phase locking circuit 40 outputs a phase command value θ* based on the phase of the AC output voltage $V_{out}$.

Decision unit 41 decides whether the AC output-voltage $V_{out}$ is equal to or greater than a predetermined threshold value. That is, the decision unit 41 may decide whether the voltage in the system of the AC side of the power conversion circuit 15 has returned from the disturbance.

The second coordinate converter 42 performs abc-axis/dq-axis conversion, i.e. conversion from three-phase to two-phase. Thus, the second coordinate converter 42 calculates the d-axis output voltage $V_d$ and q-axis output voltage $V_q$ from the AC output voltage $V_{out}$.

The third coordinate converter 43 performs abc-axis/dq-axis conversion, i.e. conversion from three-phase to two-phase. Thus, the third coordinate converter 43 calculates the d-axis output current $i_d$ and q-axis output current $i_q$ from the AC output current $i_{out}$.

The power controller 44 calculates a decision result of the decision unit 41, the calculated value $V_d, V_q$ of the second coordinate converter 42, based on the calculated value $i_d, i_q$ of the third coordinate converter 43, and the d-axis current command value $i*_d$ and the q-axis current command value $i*_q$.

Thus, the power conversion device 10, when the detector 29 detects the opening of the contactor 13, the second controller 22 selects and outputs a command value outputted, when the detector 29 detects the return from the disturbance of the voltage, so that the first controller 21 selects and outputs the command value held, the switch 23 since controlling the switching, even if a difference occurs in the DC voltage of the DC input voltage and the inverter side because the disturbance occurs in the system of the AC side, it is possible to enhance the responsiveness to return to normal operation after the disturbance elimination of the AC side system.

Further, the power conversion device 10, the detector 29 detects the opening and closing of the contactor 13, by the switching controller 30 controls the switch 23 in accordance with the detection result of the detector 29, the power failure compensation circuit or the like for maintaining the input of the contactor 13 it can be made unnecessary.

Incidentally, the DC power supply 11 may be, for example, one of the power supply of the solar cell panel and the storage battery may be provided with both of these power supplies. The battery may comprise a variety of known secondary or fuel cells. Further, the wind power generator and the AC-DC converter device may be a DC power supply 11. Further, the DC power supply 11 may be a variety of renewable energy power generation devices.

Each function of the control performed by the power conversion device 10 may be constituted by hardware, such as a part or all PLD (Programmable Logic Device) and FPGA(Field Programmable Gate Array, respectively, a processor such as a CPU may be configured as a program to be executed.

Further, the control performed by the power conversion device 10 according to the present invention can be implemented using a computer and a program, it is possible to record a program on a storage medium or provide through a network.

REFERENCE SIGNS LIST

10 . . . power conversion device
11 . . . DC power supply
12 . . . power grid
13 . . . contactor
14 . . . DC capacitor
15 . . . power conversion circuit
16a . . . AC reactor
16b . . . AC capacitor
17 . . . contactor
18 . . . MPPT controller
19 . . . first subtractor
20 . . . second subtractor
21 . . . first controller
22 . . . second controller
23 . . . switch
24 . . . first adder
25 . . . first coordinate converter
26 . . . third subtractor
27 . . . current controller
28 . . . PWM drive circuit
29 . . . detector
30 . . . switching controller
41 . . . decision unit
42 . . . second coordinate converter
43 . . . third coordinate converter
44 . . . power controller

The invention claimed is:
1. A power conversion device comprising:
a power conversion circuit configured to convert DC power supplied from a DC power supply into AC power based on a pulse width modulated (PWM) signal;
a DC capacitor being charged by DC voltage provided on a DC side of the power conversion circuit;
a contactor configured to open or close by power supplied from a power system on an AC side of the power conversion circuit to supply or shutoff the DC power from the DC power supply to the DC capacitor and the power conversion circuit;
a first DC voltage controller configured to control DC voltage used for reference of the PWM signal by outputting a first command value and holding a last output command value;
a second DC voltage controller configured to control the DC voltage used for the reference of the PWM signal by outputting a second command value to reduce a difference between DC voltage of the DC power supply and the DC voltage provided on the DC side of the power conversion circuit;

a switch configured to perform switching to select and output any one of the last output command value held by the first DC voltage controller and the second command value output by the second DC voltage controller;

a detector configured to detect opening of the contactor and recovery from voltage disturbance in the power system on the AC side of the power conversion circuit;

a switching controller configured to control the switching of the switch to select and output the second command value output by the second DC voltage controller upon the detector detecting the opening of the contactor, and to select and output the last output command value held by the first DC voltage controller upon the detector detecting the recovery from the voltage disturbance;

an adder;

a coordinate converter;

a subtractor;

a current controller configured to calculate a current command value based on an output of the subtractor; and a PWM drive circuit configured to generate the PWM signal according to the current command value of the current controller, wherein the adder is directly connected to the switch, the coordinate converter is connected between the adder and the subtractor, the current controller is connected to the subtractor, and the PWM drive circuit is connected to the current controller and is used to control the power conversion circuit.

* * * * *